(12) United States Patent
Koda et al.

(10) Patent No.: US 9,784,315 B2
(45) Date of Patent: Oct. 10, 2017

(54) BEARING ASSEMBLY FOR A TURBOCHARGER, AND A METHOD FOR MANUFACTURING A BEARING ASSEMBLY FOR A TURBOCHARGER

(71) Applicant: NTN CORPORATION, Osaka (JP)

(72) Inventors: Tsuyoshi Koda, Shizuoka (JP); Goro Nakao, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/030,693

(22) PCT Filed: Oct. 21, 2014

(86) PCT No.: PCT/JP2014/077955
§ 371 (c)(1),
(2) Date: Apr. 20, 2016

(87) PCT Pub. No.: WO2015/060304
PCT Pub. Date: Apr. 30, 2015

(65) Prior Publication Data
US 2016/0252134 A1    Sep. 1, 2016

(30) Foreign Application Priority Data

Oct. 22, 2013  (JP) ................................ 2013-219371

(51) Int. Cl.
*F16C 33/58* (2006.01)
*F16C 33/66* (2006.01)
(Continued)

(52) U.S. Cl.
CPC ............ *F16C 33/581* (2013.01); *F01D 25/16* (2013.01); *F16C 19/548* (2013.01);
(Continued)

(58) Field of Classification Search
CPC ...... F16C 19/08; F16C 19/163; F16C 19/548; F16C 33/585; F16C 33/581;
(Continued)

(56) References Cited

U.S. PATENT DOCUMENTS

| | | | | |
|---|---|---|---|---|
| 4,721,398 A | * | 1/1988 | Miyashita | ............. F01D 25/164 384/466 |
| 4,721,441 A | * | 1/1988 | Miyashita | ............. F01D 25/164 384/518 |

(Continued)

FOREIGN PATENT DOCUMENTS

| | | |
|---|---|---|
| JP | 60-137131 | 9/1985 |
| JP | 62-35195 | 3/1987 |

(Continued)

OTHER PUBLICATIONS

Extended European Search Report issued Sep. 15, 2016 in corresponding European Application No. 14855319.1.

(Continued)

*Primary Examiner* — Marcus Charles
(74) *Attorney, Agent, or Firm* — Wenderoth, Lind & Ponack, L.L.P.

(57) ABSTRACT

A bearing assembly for a turbocharger includes a turbine wheel-side ball bearing at a first axial end of a tubular body, a compressor impeller-side ball bearing at a second axial end of the tubular body, and a bearing housing. The bearing housing includes a first opposed wall opposed to an axially outer side of an outer race of the turbine wheel-side ball bearing, and a second opposed wall opposed to an axially outer side of an outer race of the compressor impeller-side ball bearing. The outer race of the turbine wheel-side ball bearing and the outer race of the compressor impeller-side ball bearing have axially outer end surfaces which are axially outwardly displaced from respective axial end surfaces of the tubular body so that oil films are present (Continued)

between the respective outer races and the corresponding opposed walls.

9 Claims, 6 Drawing Sheets

(51) Int. Cl.
| | | |
|---|---|---|
| *F16C 19/54* | (2006.01) | |
| *F01D 25/16* | (2006.01) | |
| *F16C 27/04* | (2006.01) | |
| *F16C 35/067* | (2006.01) | |
| *F16C 35/12* | (2006.01) | |
| *F16C 19/16* | (2006.01) | |

(52) U.S. Cl.
CPC .......... *F16C 27/045* (2013.01); *F16C 33/585* (2013.01); *F16C 33/586* (2013.01); *F16C 33/6659* (2013.01); *F16C 35/067* (2013.01); *F16C 35/12* (2013.01); *F05B 2220/40* (2013.01); *F16C 19/163* (2013.01); *F16C 2360/24* (2013.01)

(58) Field of Classification Search
CPC .. F16C 33/6659; F16C 27/045; F16C 35/067; F16C 35/12; F16C 2360/24; F16C 39/00; F05B 2220/40; F01D 25/16
USPC ......... 384/99, 474, 467, 490, 504, 506, 510, 384/564; 29/898.062, 898.07, 898.1; 415/170.1
See application file for complete search history.

(56) References Cited

U.S. PATENT DOCUMENTS

| | | | | |
|---|---|---|---|---|
| 4,997,290 A | * | 3/1991 | Aida | ..................... F01D 25/164 384/474 |
| 5,145,334 A | * | 9/1992 | Gutknecht | ............ F01D 25/164 417/407 |
| 2011/0236193 A1 | | 9/2011 | Chriss et al. | |
| 2012/0034073 A1 | * | 2/2012 | House | ..................... F01D 25/16 415/170.1 |
| 2012/0039555 A1 | * | 2/2012 | Tabata | ..................... F01D 5/027 384/490 |

FOREIGN PATENT DOCUMENTS

| | | | | | |
|---|---|---|---|---|---|
| JP | 63215830 A | * | 9/1988 | | |
| JP | 63-186934 | | 11/1988 | | |
| JP | 4-8825 | | 1/1992 | | |
| JP | 4-72424 | | 3/1992 | | |
| JP | 04072424 A | * | 3/1992 | .............. | F16C 27/04 |
| JP | 6-40908 | | 10/1994 | | |
| JP | 2004183781 A | * | 7/2004 | ............ | F16C 19/548 |
| JP | 2005214262 A | * | 8/2005 | .............. | F16C 33/58 |
| JP | 2005-335455 | | 12/2005 | | |
| JP | 2012-092934 | | 5/2012 | | |
| JP | 2012092916 A | * | 5/2012 | .............. | F16C 19/38 |
| JP | 5075000 | | 11/2012 | | |
| JP | 2016113937 A | * | 6/2016 | | |
| WO | WO-0206649 A1 | * | 1/2002 | ............. | F01D 25/16 |
| WO | WO-2005073575 A1 | * | 8/2005 | ........... | F16C 19/163 |
| WO | 2010/109653 | | 9/2010 | | |

OTHER PUBLICATIONS

International Search Report issued Jan. 27, 2015 in corresponding International Application No. PCT/JP2014/077955 (with English translation).
Written Opinion of the International Searching Authority in corresponding International Application No. PCT/JP2014/077955 (with English translation).

* cited by examiner

BEARING ASSEMBLY FOR A TURBOCHARGER, AND A METHOD FOR MANUFACTURING A BEARING ASSEMBLY FOR A TURBOCHARGER

CROSS-REFERENCE TO RELATED APPLICATION

This application is the National Stage of International Application No. PCT/JP2014/077955, filed Oct. 21, 2014 which is based on and claims the benefit of priority from Japanese Patent Application No. 2013-219371, filed on Oct. 22, 2013, the contents of which are incorporated herein by reference.

TECHNICAL FIELD

The present invention relates to a bearing assembly for supporting a turbocharger used in an internal combustion engine.

Ordinarily, a turbocharger is used to improve the efficiency of an internal combustion engine. A turbocharger includes a turbine wheel disposed in the exhaust line of an internal combustion engine, a compressor impeller disposed in the intake line of the internal combustion engine, and a turbine shaft through which the turbine wheel is coupled to the compressor impeller, and configured such that the turbine wheel is rotated under the power of exhaust gas passing through the exhaust line of the internal combustion engine, and the rotation of the turbine wheel is transmitted to the compressor impeller, thereby compressing air in the intake line of the internal combustion engine. The compressed air is then mixed with fuel, and the air-fuel mixture is introduced into the internal combustion engine.

The turbine shaft of such a turbocharger is rotated at an extremely high speed, i.e. at around 100,000 to 200,000 rotations per minute. In order to reduce vibrations of the turbine shaft while it is rotating at such a high speed, the turbine shaft is often supported by a bearing assembly in which is used an oil film damper. An oil film damper is a mechanism in which oil supplied from an oil pump is introduced to around a supported member to support the supported member by oil film, thereby reducing vibrations of the supported member.

The below-identified Patent documents 1 to 4 disclose bearing assemblies for turbochargers, of the above-described type. Any of these bearing assemblies includes a pair of ball bearings supporting the turbine shaft (which comprise a turbine wheel-side ball bearing and a compressor impeller-side ball bearing), and a spring mounted between the outer race of the turbine wheel-side ball bearing and the outer race of the compressor impeller-side ball bearing so as to bias the outer races in the directions away from each other, thereby applying a preload to the respective pair of ball bearings under the force of the spring.

The bearing assemblies disclosed in Patent documents 1 to 4 have a problem in that since a preload is applied to the ball bearings by the spring, friction loss in the ball bearings are relatively large.

To avoid this problem, i.e. to reduce friction loss in the ball bearings, the below-identified Patent document 5 proposes a bearing assembly which does not include a spring for applying a preload. This bearing assembly includes a tubular body through which the turbine shaft extends, a turbine wheel-side ball bearing mounted at one axial end of the tubular body, a compressor impeller-side ball bearing mounted at the other axial end of the tubular body, an outer race spacer disposed between the outer race of the turbine wheel-side ball bearing and the outer race of the compressor impeller-side ball bearing, and a bearing housing in which is mounted the tubular body.

This bearing assembly is configured such that oil films form between the inner periphery of the bearing housing and the outer periphery of the tubular body to radially support the tubular body. The bearing housing has a pair of opposed walls opposed to the respective axial end surfaces of the tubular body, whereby oil films also form between the respective opposed walls and the axial end surfaces of the tubular body. In this bearing assembly, the outer race of the turbine wheel-side ball bearing and the outer race of the compressor impeller-side ball bearing are at positions retracted from the respective axial ends of the tubular body, while being fitted to the tubular body so as to be movable axially outwardly.

The bearing assembly disclosed in Patent document 5 is arranged such that the outer race of the turbine wheel-side ball bearing and the outer race of the compressor impeller-side ball bearing are kept axially spaced apart from each other by the outer race spacer disposed between the outer races. Since there is no spring for applying a preload between the outer races, it is possible to reduce friction loss. Also, in this bearing assembly, since oil films form along the outer periphery and both ends of the tubular body in which is mounted the pair of ball bearings supporting the turbine shaft, it is possible to effectively reduce vibrations of the turbine shaft.

PRIOR ART DOCUMENTS

Patent Documents

Patent document 1: JP Utility Model Publication 62-35195U
Patent document 2: JP Patent Publication 4-72424A
Patent document 3: JP Patent Publication 4-8825A
Patent document 4: JP Utility Model Publication 6-40908Y
Patent document 5: JP Patent 5075000

OBJECT OF THE INVENTION

With the bearing assembly disclosed in Patent document 5, the pair of ball bearings supporting the turbine shaft are both retracted from the respective axial end surfaces of the tubular body, so that the outer races of the ball bearings are freely axially outwardly movable.

Thus, while the turbine shaft is rotating at a high speed, the outer races of the pair of ball bearings are moved axially due to vibrations of the turbine shaft. While oil films form on the axial end surfaces of the tubular body, and serve to absorb vibrations of the turbine shaft, there are no oil films that serve to absorb vibrations on the axial end surfaces of the outer races of the pair of ball bearings supporting the turbine shaft, so that the outer races are freely axially outwardly movable. This destabilizes the contact positions (contact angles) of the balls relative to the respective outer races, due to vibrations of the turbine shaft. As a result, especially when the turbine shaft is subjected to resonance or self-excited vibrations due to forced vibrations, the ball bearings could be heated or become worn abnormally due to slippage between the balls and the outer races.

SUMMARY OF THE INVENTION

An object of the present invention is to provide a bearing assembly for a turbocharger of which the pair of ball bearings supporting the turbine shaft are less likely to be heated or become worn abnormally when the turbine shaft vibrates.

Means for Achieving the Object

In order to achieve this object, this invention provides a bearing assembly for a turbocharger, comprising:

a tubular body through which extends a turbine shaft through which a turbine wheel and a compressor impeller are coupled together;

a turbine wheel-side ball bearing comprising an outer race fitted to one of two axial end portions of the tubular body, an inner race provided inside of the outer race and fitted to an outer periphery of the turbine shaft, and a plurality of balls disposed between the outer race and the inner race;

a compressor impeller-side ball bearing comprising an outer race fitted to the other of the two axial end portions of the tubular body, an inner race provided inside of the outer race of the compressor impeller-side bearing and fitted to the outer periphery of the turbine shaft, and a plurality of balls disposed between the outer race and the inner race, of the compressor impeller-side ball bearing;

an outer race spacer disposed between the outer race of the turbine wheel-side ball bearing and the outer race of the compressor impeller-side ball bearing, and keeping the outer race of the turbine wheel-side ball bearing and the outer race of the compressor impeller-side ball bearing axially spaced apart from each other; and a bearing housing in which is mounted the tubular body such that an oil film capable of radially supporting the tubular body forms along an outer periphery of the tubular body, wherein the bearing housing includes a turbine wheel-side opposed wall opposed to an axially outer side of the outer race of the turbine wheel-side ball bearing, and a compressor impeller-side opposed wall opposed to an axially outer side of the compressor impeller-side ball bearing, and wherein the tubular body has two axial end surfaces, and the outer race of the turbine wheel-side ball bearing and the outer race of the compressor impeller-side ball bearing each have an axial end surface located at the same axial position as, or at a position axially outwardly displaced from, the corresponding one of the two axial end surfaces of the tubular body, such that oil films capable of axially supporting the outer races form between the respective outer races and the corresponding opposed walls.

With this arrangement, since oil films capable of absorbing vibrations form along the axial end surfaces of the outer races of the pair of ball bearings supporting the turbine shaft (i.e. the turbine wheel-side ball bearing and the compressor impeller-side ball bearing), slippage is less likely to occur between the outer races and the balls due to vibrations of the turbine shaft, which in turn prevents heating and abnormal wear of the ball bearings supporting the turbine shaft. Since the outer race of the turbine wheel-side ball bearing and the outer race of the compressor impeller-side ball bearing are axially spaced apart from each other by the outer race spacer disposed between the outer races, friction loss of the ball bearings is smaller than in bearing assemblies which include a spring for preloading disposed between the outer races of the ball bearings.

The outer race spacer may be a member separate from, and mounted to, the tubular body, but is preferably integral with the tubular body, because with the latter arrangement, since the relative position between the tubular body and the outer race spacer is fixed, it is possible to control the relative positions between the axial outer ends of the outer races and the respective axial ends of the tubular body with high accuracy.

An inner race spacer may be disposed between the inner race of the turbine wheel-side ball bearing and the inner race of the compressor impeller-side ball bearing to keep the inner races axially spaced from each other, but instead of the inner race spacer, the inner race of the turbine wheel-side ball bearing and the inner race of the compressor impeller-side ball bearing may each have an inner race extensions extending axially inwardly such that the axially inner end surfaces of the respective inner races contact each other. With the latter arrangement, when inserting the turbine shaft through the inner race of the turbine wheel-side ball bearing and the inner race of the compressor impeller-side ball bearing, the turbine shaft can be easily inserted through the inner races 11 because there is no inner race spacer therebetween.

The present invention also provides a method of manufacturing the above-described bearing assembly for a turbocharger, the method comprising:

an outer race manufacturing step of manufacturing outer race members each of which can constitute the outer race of the turbine wheel-side ball bearing, and outer race members each of which can constitute the outer race of the compressor impeller-side ball bearings;

an outer race classifying step of classifying the outer race members manufactured in the outer race manufacturing step into a plurality of groups according to axial width dimensions of the outer race members;

a tubular body manufacturing step of manufacturing tubular body members each of which can constitute the tubular body, and is integral with an outer race spacer member corresponding to the outer race spacer;

a tubular body classifying step of classifying the tubular body members into a plurality of groups according to axial width dimensions of the corresponding outer race spacer members; and a matching step of matching the groups classified in the outer race classifying step with the groups classified in the tubular body classifying step, and assembling together outer race members of one of the groups classified in the outer race classifying step, and a tubular body member of one of the groups classified in the tubular body classifying step that is matched with said one of the groups classified in the outer race classifying step, into the bearing assembly.

By using this manufacturing method in manufacturing the bearing assembly for a turbocharger according to the present invention, it is possible to set the axial dimension from the axially outer end surface of the outer race of the turbine wheel-side ball bearing to the axially outer end surface of the outer race of the compressor impeller-side ball bearing with high accuracy, irrespective of variations in (tolerance of) the axial width dimensions of the outer races, which inevitably occurs when manufacturing the outer races, and irrespective of variations in the axial width dimension of the outer race spacer, which inevitably occurs when manufacturing the outer race spacer. This in turn makes it possible to stably form oil films having a constant thickness along the axial end surfaces of the outer races of the two ball bearings supporting the turbine shaft.

Advantages of the Invention

Since the bearing assembly for a turbocharger according to the present invention is configured such that the pair of ball bearings supporting the turbine shaft are axially supported by oil films that form along the axial end surfaces of the outer races, slippage is less likely to occur between the outer races and the balls when the turbine shaft is vibrated, which in turn prevents heating and abnormal wear of the ball bearings.

BEST MODE FOR EMBODYING THE INVENTION

Figure 1:
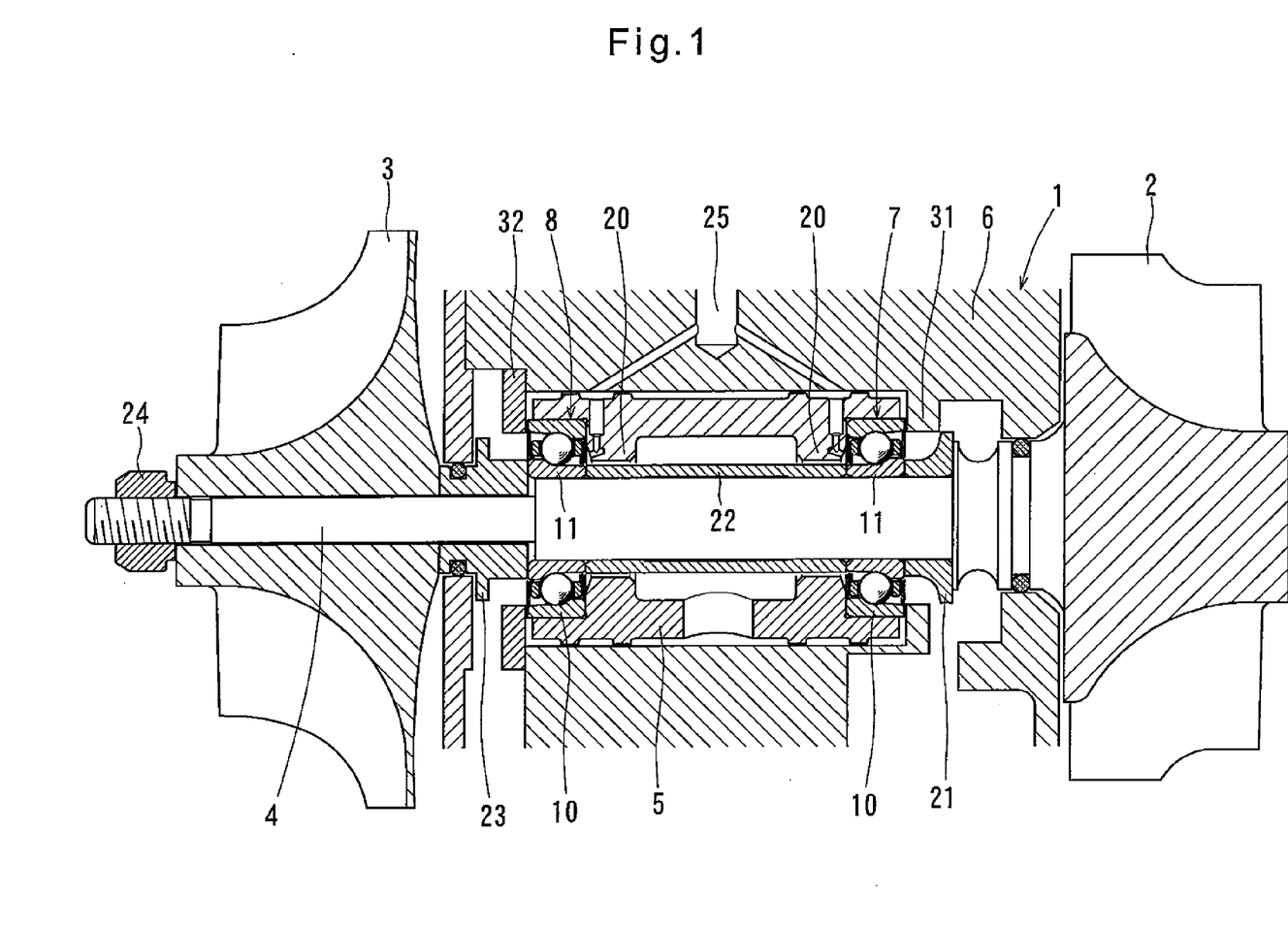
FIG. 1 is a sectional view of a turbocharger to which is mounted a bearing assembly for a turbocharger embodying the present invention.

FIG. 1 shows a turbo charger in which is mounted a bearing assembly 1 for a turbocharger embodying the present invention. The turbocharger includes a turbine wheel 2 arranged in an exhaust line of an internal combustion engine, a compressor impeller 3 arranged in an intake line of the internal combustion engine, and a turbine shaft 4 through which the turbine wheel 2 is coupled to the compressor impeller 3, and is configured such that the turbine wheel 2 is rotated under the force of the exhaust gas that passes through the exhaust line of the internal combustion engine, and its rotation is transmitted to the compressor impeller 3 through the turbine shaft 4, thereby compressing air in the intake line of the internal combustion engine. At this time, the turbine shaft 4 is rotated at an extremely high speed, namely, at around 100,000 to 200,000 rotations per minute.

The bearing assembly 1 for a turbocharger includes a tubular body 5 through which the turbine shaft 4 extends, a bearing housing 6 in which is received the tubular body 5, a turbine wheel-side ball bearing 7 mounted in the tubular body 5 at one axial end thereof, and a compressor impeller-side ball bearing 8 mounted in the tubular body 5 at the other axial end thereof. The turbine wheel-side ball bearing 7 and the compressor impeller-side bearing 8 rotatably support the turbine shaft 4.

Figure 2:
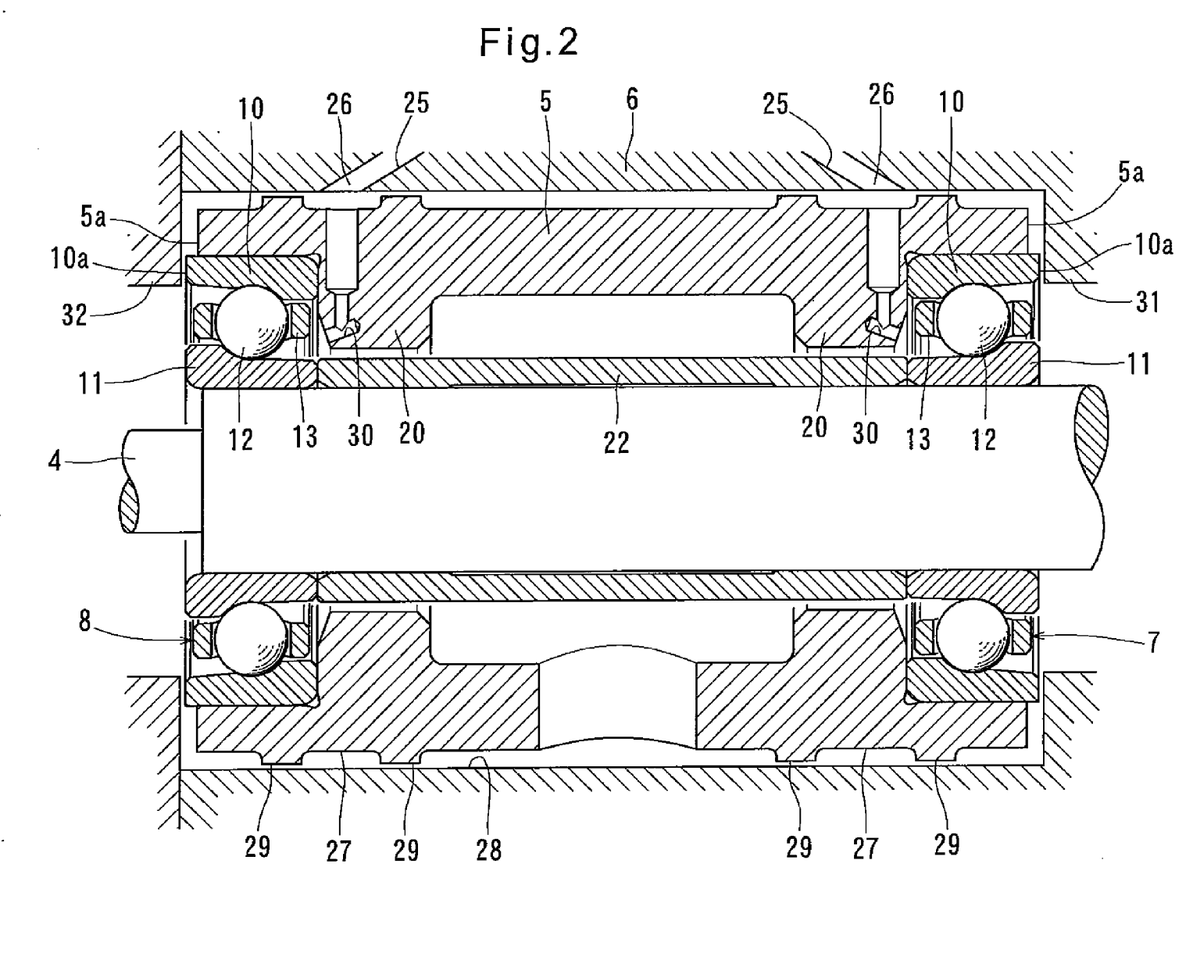
FIG. 2 is an enlarged sectional view of the bearing assembly for a turbocharger shown in FIG. 1.

As shown in FIG. 2, the turbine wheel-side ball bearing 7 includes an outer race 10 fitted in the one axial end of the tubular body 5, an inner race 11 arranged inside of the outer race 10 and fitted on the outer periphery of the turbine shaft 4, a plurality of balls 12 disposed between the outer race 10 and the inner race 11, and an annular retainer 13 retaining the balls 12.

Similarly, the compressor impeller-side ball bearing 8 includes an outer race 10 fitted in the other axial end of the tubular body 5, an inner race 11 arranged inside of the outer race 10 and fitted on the outer periphery of the turbine shaft 4, a plurality of balls 12 disposed between the outer race 10 and the inner race 11, and an annular retainer 13 retaining the balls 12.

Each of the turbine wheel-side ball bearing 7 and the compressor impeller-side ball bearing 8 of the bearing assembly 1 for a turbocharger is an angular ball bearing, i.e. a bearing having such a structure that the straight line passing through the contact point between the inner race 11 and each ball 12 and the contact point between the outer race 10 and the ball 12 extends obliquely axially inwardly from the radially inner side toward the radially outside. The turbine wheel-side ball bearing 7 and the compressor impeller-side ball bearing 8 are therefore capable of supporting both radial loads and axial loads applied to the turbine shaft 4.

However, depending on the magnitudes of radial loads and axial loads that are applied to the turbine shaft 4, and/or the installation space available for the bearings, the bearings 7 and 8 are not necessarily limited to angular ball bearings, but may rather be radial ball bearings, i.e. bearings having such a structure that the straight line passing through the contact point between the inner race 11 and each ball 12 and the contact point between the outer race 10 and the ball 12 extends in the radial direction of the bearing.

Figure 3:
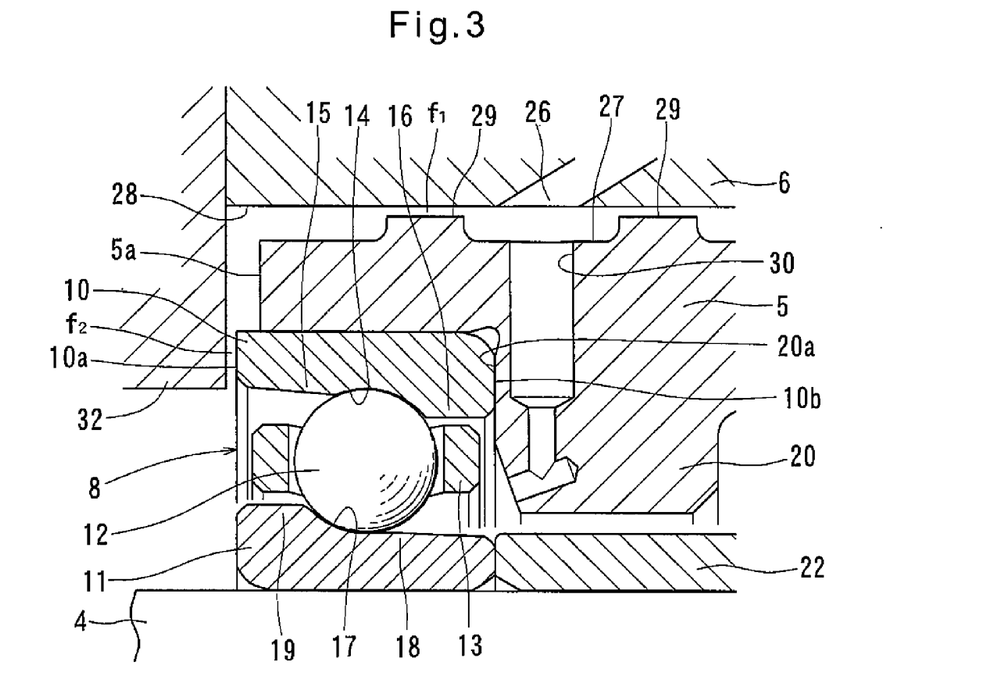
FIG. 3 is an enlarged sectional view of and around a compressor impeller-side ball bearing of the bearing assembly shown in FIG. 1.

As shown in FIG. 3, the outer race 10 of the compressor impeller-side ball bearing 8 is a counterbore outer race of which the axially outer shoulder 15 of the raceway groove 14, in which the balls 12 roll, is lower than the axially inner shoulder 16 of the raceway groove 14, while the inner race 11 of the compressor impeller-side ball bearing 8 is a counterbore inner race of which the axially inner shoulder 18 of the raceway groove 17, in which the balls 12 roll, is lower than the axially outer shoulder 19 of the raceway groove 17. The outer race 10 and the inner race 11 of the turbine wheel-side ball bearing 7 are also shaped and arranged in the above-described manner. This means that the turbine wheel-side ball bearing 7 and the compressor impeller-side ball bearing 8 are identical in shape to each other, and are mounted in position so as to be symmetrical to each other.

As shown in FIG. 2, the bearing assembly further includes an outer race spacer 20 provided between the outer race 10 of the turbine wheel-side ball bearing 7 and the outer race 10 of the compressor impeller-side ball bearing 8 and keeping the outer races 10 axially spaced from each other. The outer race spacer 20 may be formed separately from, and mounted to, the tubular body 5. In this embodiment, however, the outer race spacer 20 is integrally and seamlessly formed on the tubular body 5, that is, the outer race spacer 20 is a radially inwardly extending annular protrusion formed on the inner periphery of the tubular body 5. As shown in FIG. 3, the outer race spacer 20 has axially outer end surfaces 20a kept in abutment with axially inner end surfaces 10b of the respective outer races 10.

The outer race spacer 20 (i.e. the inner peripheral portion of the tubular body 5 sandwiched between the outer race 10 of the turbine wheel-side ball bearing 7 and the outer race 10 of the compressor impeller-side ball bearing 8) may be formed such that the tubular body 5 has a uniform radial thickness over the entire axial length thereof. However, in this embodiment, for reduced weight, the outer race spacer 20 is formed such that, as shown in FIG. 2, the tubular body 5 has a reduced radial thickness at its axially central portion.

As shown in FIG. 1, the turbine shaft 4 is integral with the turbine wheel 2. The turbine shaft 4 has fitted on its outer periphery, from the side of the turbine wheel 2 toward the compressor impeller 3, a slinger 21, the inner race 11 of the turbine wheel-side ball bearing 7, an inner race spacer 22, the inner race 11 of the compressor impeller-side ball bearing 8, and a slinger 23. The slinger 21, the inner race 11 of the compressor impeller-side ball bearing 8, the inner race spacer 22, the inner race 11 of the turbine wheel-side ball bearing 7, and the slinger 23 are fixed to the turbine shaft 4 by tightening a nut 24 fitted on the turbine shaft 4 at its end on the side of the compressor impeller 3.

The inner race spacer 22 keeps the inner race 11 of turbine wheel-side ball bearing 7 and the inner race 11 of the compressor impeller-side ball bearing 8 axially spaced from each other. The slingers 21 and 23 are annular members rotatable together with the turbine shaft 4, and prevent leakage of lubricating oil utilizing the centrifugal force generated when the turbine shaft 4 rotates. The bearing housing 6 is formed with an oil supply passage 25 through which lubricating oil is introduced from an oil pump, not shown, into the space between the inner periphery of the bearing housing 6 and the outer periphery of the tubular body 5. As shown in FIG. 2, the oil supply passage 25 has two axially spaced apart outlets 26 at the inner periphery of the bearing housing 6.

As shown in FIG. 3, the tubular body 5 has, on its outer periphery, circumferentially extending oil grooves 27 so as to be opposed to the respective outlets 26 of the oil supply passage 25, and cylindrical surfaces 29 provided on both axial sides of the respective oil grooves 27 so as to be opposed to a cylindrical surface 28 on the inner periphery of the bearing housing 6 with minute gaps left between the respective cylindrical surfaces 29 and the cylindrical surface 28. The gaps between the cylindrical surface 28 on the inner periphery of the housing and the respective cylindrical surfaces 29 on the outer periphery of the tubular body 5 are 10 to 60 micrometers in size.

When lubricating oil is supplied into between the inner periphery of the bearing housing 6 and the outer periphery of the tubular body 5 from the oil supply passage 25 of the bearing housing 6, oil films $f_1$ form in the gaps between the cylindrical surface 28 on the inner periphery of the housing and the respective cylindrical surfaces 29 on the outer periphery of the tubular body 5. The oil films $f_1$ radially support the tubular body 5, and act as a damper for absorbing diametric vibrations of the turbine shaft 4 by the viscoelasticity of the lubricating oil.

The tubular body 5 is further formed with oil holes 30 extending from the respective oil grooves 27, which are formed in the outer periphery of the tubular body 5, to the inner periphery of the tubular body 5, and having ends on the inner peripheral side of the tubular body that open at the respective axially outer end surfaces 20a of the outer race spacer 20. Thus, the compressor impeller-side ball bearing 7 and the turbine wheel-side ball bearing 8 are lubricated by lubricating oil blown out of the oil holes 30. The outer race spacer 20 has an inner diameter smaller than the inner diameters of the retainers of the compressor impeller-side ball bearing 7 and the turbine wheel-side ball bearing 8, and the oil holes 30 open at radial positions which are the same as, or radially inwardly of, the radial positions of the radially inner surfaces of the retainers 13 of the compressor impeller-side ball bearing 7 and the turbine wheel-side ball bearing 8. This makes it possible to effectively lubricate the contact points between the balls 12 and the inner race 11 of each bearing 7 and 8.

As shown in FIG. 2, the bearing housing 6 includes a turbine wheel-side opposed wall 31 opposed to the axially outer side of the outer race 10 of the turbine wheel-side ball bearing 7, and a compressor impeller-side opposed wall 32 opposed to the axially outer side of the outer race 10 of the compressor impeller-side ball bearing 8. The turbine wheel-side opposed wall 31 is integral with the bearing housing 6. The compressor impeller-side opposed wall 32 is formed separately from the bearing housing 6, and fixed to the bearing housing 6 by bolts, not shown.

As shown in FIG. 3, the outer race 10 of the compressor impeller-side ball bearing 8 has an axial end surface 10a which is axially outwardly displaced from the axial end surface 5a of the tubular body 5, and which is axially opposed to the compressor impeller-side opposed wall 32 with a minute gap left between the end surface 10a and the opposed wall 32. Similarly, the outer race 10 of the turbine wheel-side ball bearing 7 has an axial end surface 10a which is axially outwardly displaced from the axial end surface 5a of the tubular body 5, and which is axially opposed to the turbine wheel-side opposed wall 31 with a minute gap left between the end surface 10a and the opposed wall 31. The gaps between the axial end surfaces 10a of the respective outer races 10 of the compressor impeller-side ball bearing 8 and the turbine wheel-side ball bearings 7 and the corresponding opposed walls 31 and 32 are 10 to 60 micrometers in size.

With this arrangement, when lubricating oil is supplied from the oil supply passage 25 of the bearing housing 6 into between the inner periphery of the bearing housing 6 and the outer periphery of the tubular body 5, the lubricating oil is partially supplied through the gaps between the axial end surfaces 5a of the tubular body 5 and the opposed walls 31 and 32 into the gaps between the axial end surfaces 10a of the respective outer races 10 of the compressor impeller-side ball bearing 8 and the turbine wheel-side ball bearings 7 and the corresponding opposed walls 31 and 32, whereby oil films $f_2$ form between the axial end surfaces 10a of the outer races 10 and the opposed walls 31 and 32. The oil films $f_2$ axially support the respective outer races 10, and act as a damper for absorbing axial vibrations of the turbine shaft 4 by the viscoelasticity of the lubricating oil.

With this bearing assembly 1 for a turbocharger, since the outer races 10 of the turbine wheel-side ball bearing 7 and the compressor impeller-side ball bearing 8 are axially supported by the oil films $f_2$ which form along the axially outer end surfaces 10a of the outer races 10, slippage is less likely to occur between the outer races 10 and the balls 12 even when the turbine shaft 4 vibrates. This in turn prevents heat buildup and abnormal wear of the turbine wheel-side ball bearing 7 and the compressor impeller-side ball bearing 8.

Also, with this bearing assembly 1 for a turbocharger, since the outer race 10 of the turbine wheel-side ball bearing 7 and the outer race 10 of the compressor impeller-side ball bearing 8 are kept axially spaced apart from each other by the outer race spacer 20 disposed between the outer races 10, the friction loss of the ball bearings 7 and 8 are small compared to a bearing assembly which includes a preloading spring disposed between the outer races 10.

Also with this bearing assembly for a turbocharger, since the outer race spacer 20 is integral with the tubular body 5, the axial relative position between the tubular body 5 and the outer race spacer 20 is fixed, so that it is possible to control the relative position between the axial end surfaces 10a of the outer races 10 and the axial end surfaces 5a of the tubular body 5.

Figure 4:
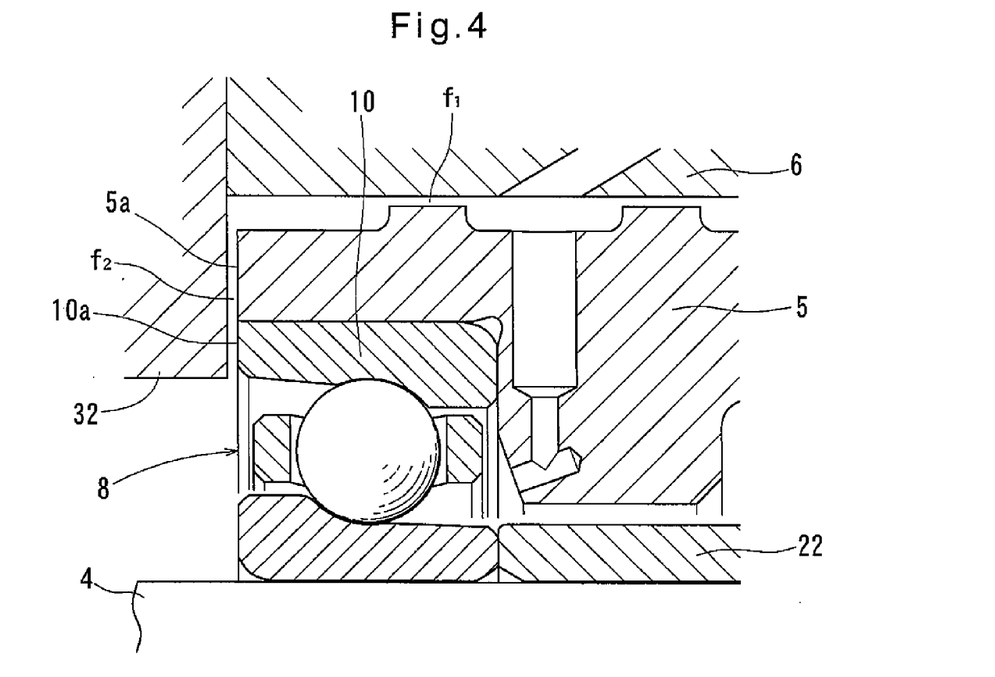
FIG. 4 is an enlarged sectional view of a modification of the bearing assembly in which the axially outer end surface of each outer race is at the same axial position as the corresponding axial end surface of a tubular body.

In the above embodiment, the outer race 10 of the turbine wheel-side ball bearing 7 and the outer race 10 of the compressor impeller-side ball bearing 8 have their axial end surfaces 10a located at positions displaced axially outwardly from the respective end surfaces 5a of the tubular body 5. However, as shown in FIG. 4, the outer race 10 of the turbine wheel-side ball bearing 7 and the outer race 10 of the compressor impeller-side ball bearing 8 may have their axial end surfaces 10a located at positions axially coincident with the respective end surfaces 5a of the tubular body 5.

Figure 5:
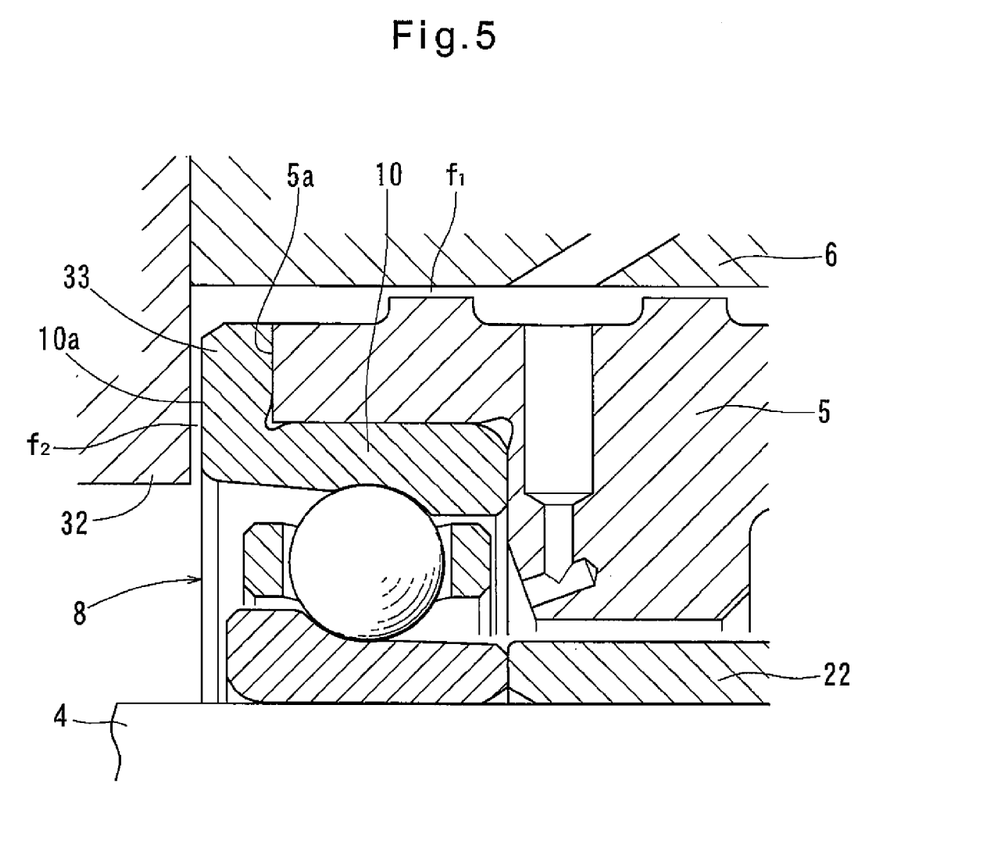
FIG. 5 is an enlarged sectional view of a modification of the bearing assembly in which each outer race has a flange portion.

Also, as shown in FIG. 5, each of the outer race 10 of the compressor impeller-side ball bearing 8 and the outer race 10 of the turbine wheel-side ball bearing 7 may be formed with a flange portion 33 extending radially outwardly along the axial end surface 5a of the tubular body 5 and having an axial end surface which constitutes the axial end surface 10a of the outer race 10. With this arrangement, the areas of the oil films $f_2$ formed between the outer races 10 and the opposed walls 31 and 32 increase, so that such films $f_2$ can more effectively absorb axial vibrations.

Figure 6:
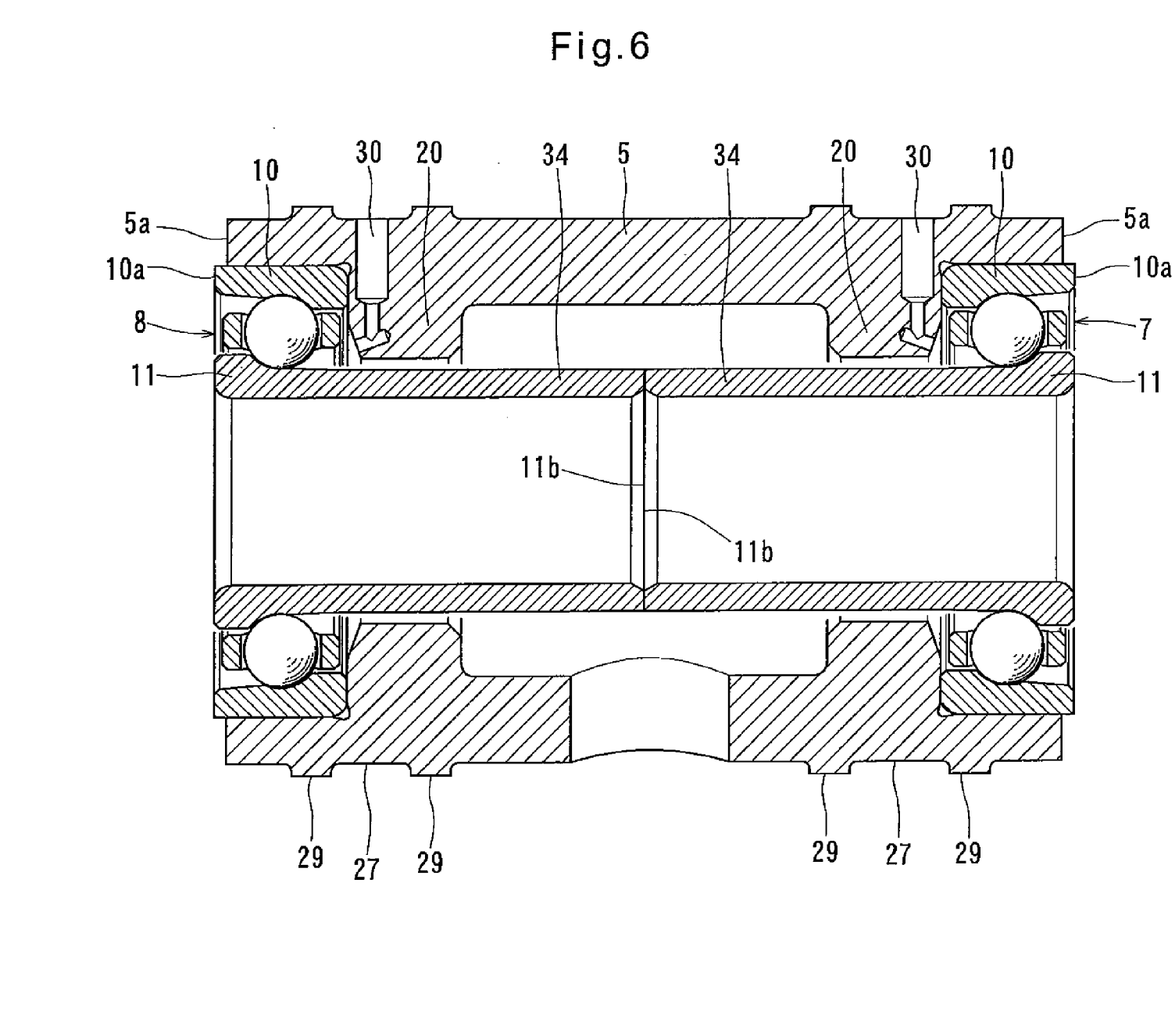
FIG. 6 is an enlarged sectional view of a modification of the bearing assembly in which, instead of an inner race spacer shown in FIG. 2, an inner race of a turbine wheel-side ball bearing and an inner race of the compressor impeller-side ball bearing have integral inner race extensions such that the end surfaces of the inner race extensions are in contact with each other.

While in the above embodiment, the inner race spacer 22 is provided between the inner race 11 of the turbine wheel-side ball bearing 7 and the inner race 11 of the compressor impeller-side ball bearing 8, instead of the inner race spacer 22, as shown in FIG. 6, the inner race 11 of the turbine wheel-side ball bearing 7 and the inner race 11 of the compressor impeller-side ball bearing 8 may be integrally formed with axially inwardly extending inner race extensions 34 such that the axially inner end surfaces 11b of the inner races 11 abut each other. With this arrangement, when inserting the turbine shaft 4, shown in FIG. 1, through the inner race 11 of the turbine wheel-side ball bearing 7 and the inner race 11 of the compressor impeller-side ball bearing 8, the turbine shaft 4 can be easily inserted through the inner races 11 because there is no inner race spacer 22 therebetween.

With this bearing assembly for a turbocharger, in order to form oil films $f_2$ stably and reliably between the outer races 10 of the turbine wheel-side ball bearing 7 and the compressor impeller-side ball bearing 8 and the corresponding opposed walls 31 and 32, it is necessary to set the axial dimension from the axially outer end surface 10a of the outer race 10 of the turbine wheel-side ball bearing 7 to the axially outer end surface 10a of the outer race 10 of the compressor impeller-side ball bearing 10 with extremely high accuracy.

However, since the axial width dimensions of the outer races 10 are influenced by manufacturing errors, they do not strictly coincide with the target dimensions, but have tolerances of about several tens micrometers relative their target values. Similarly, the axial width dimension of the outer race spacer 20 also does not strictly coincide with the target dimension, and has a tolerance of about several tens of micrometers relative to its target value. Thus, when the outer race 10 of the turbine wheel-side ball bearing 7 and the outer race 10 of the compressor impeller-side ball bearing 8 are arranged on the respective sides of the outer race spacer 20, the axial dimension from the axially outer end surface 10a of the outer race 10 of the turbine wheel-side ball bearing 7 to the axially outer end surface 10a of the outer race 10 of the compressor impeller-side ball bearing 8 has a relatively large tolerance, because this tolerance is the sum of the tolerances of the axial width dimensions of the outer races 10 and the outer race spacer 20. Thus, in order to stably and reliably form oil films $f_2$ having very small thicknesses (for example, about 10 to 60 micrometers) along the axially outer end surfaces 10a of the outer races 10 of the turbine wheel-side ball bearing 7 and the compressor impeller-side ball bearing 8, it is necessary to minimize the above-mentioned tolerances.

By manufacturing the bearing assembly 1 for a turbocharger in the below-described manner, it is possible to stably form oil films $f_2$ along the axially outer end surfaces 10a of the outer races 10 of the turbine wheel-side ball bearing 7 and the compressor impeller-side ball bearing 8.

Figure 7:
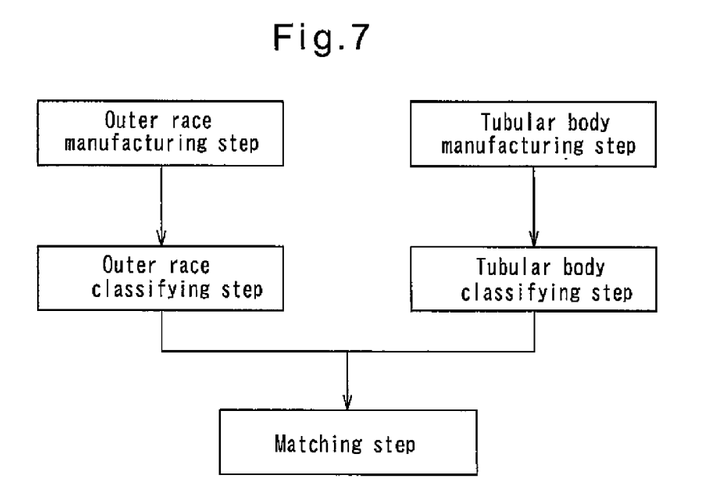
FIG. 7 shows an method of manufacturing the bearing assembly for a turbocharger embodying the present invention.

As shown in FIG. 7, a plurality of outer race members 10 each of which can constitute the outer race 10 of each of the turbine wheel-side ball bearing 7 and the compressor impeller-side ball bearing 8 are manufactured first (outer race manufacturing step). Then, the axial width dimensions of the respective outer race members 10 are measured, and the outer race members 10 are classified into a plurality of groups according to the measured width dimensions (outer race classifying step).

In a separate step, a plurality of tubular body members 5 each of which can constitute the tubular body 5 and is integrally formed with an outer race spacer member 20 corresponding to the outer race spacer 20 are manufactured (tubular body manufacturing step). Then, for the tubular body members 5 thus manufactured, the axial width dimensions of the outer race spacer members 20 are measured, and the tubular body members 5 are classified into a plurality of groups according to the measured axial width dimensions of the respective outer race spacers 20 (tubular body classifying step).

Figure 8:
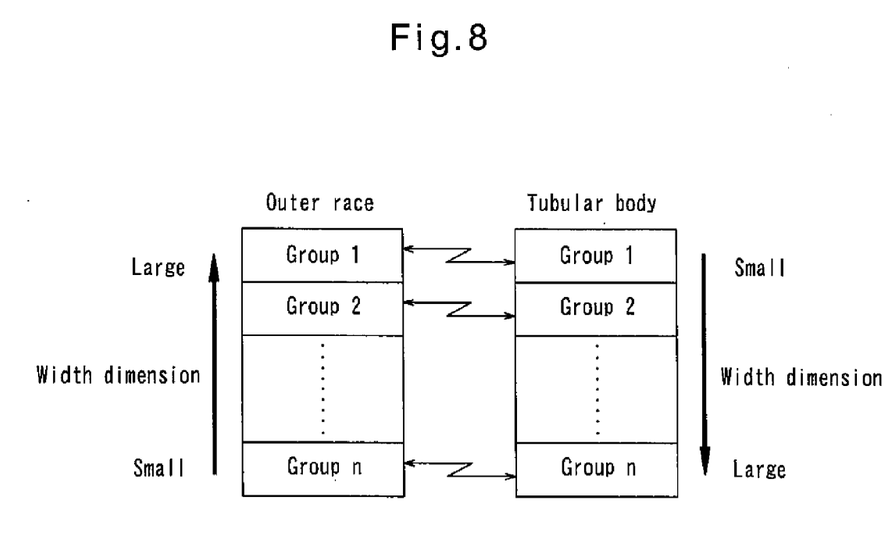
FIG. 8 shows the relationship between groups of outer race members and groups of tubular body members which are to be combined with outer race members of the corresponding groups during a matching step.

Then, as shown in FIG. 8, the outer race members 10 classified in the respective groups in the outer race classifying step are matched with the tubular body members 5 classified in the respective groups in the tubular body classifying step, and outer race members in each group and a tubular body member in the matching group are assembled into a bearing assembly (matching step in FIG. 7). At this time, the matching of the groups is performed such that groups of the outer race members 10 having larger axial width dimensions are matched with groups of the tubular body members 5 of which the outer race spacer members 20 have smaller axial width dimensions, and such that groups of the outer race members 10 having smaller axial width dimensions are matched with groups of the tubular body members 5 of which the outer race spacer members 20 have larger axial width dimensions.

By using this manufacturing method in manufacturing the bearing assembly 1 for a turbocharger according to the present invention, it is possible to set the axial dimension from the axially outer end surface 10a of the outer race 10 of the turbine wheel-side ball bearing 7 to the axially outer end surface 10a of the outer race 10 of the compressor impeller-side ball bearing 8 with high accuracy, irrespective of variations in (tolerance of) the axial width dimensions of the outer races 10, which inevitably occurs when manufacturing the outer races 10, and irrespective of variations in the axial width dimension of the outer race spacer 20, which inevitably occurs when manufacturing the outer race spacer 20. This in turn makes it possible to stably form oil films $f_2$ having a constant thickness along the axial end surfaces 10a of the outer races 10 of the two ball bearings supporting the turbine shaft 4.

DESCRIPTION OF THE NUMERALS

2. Turbine wheel
3. Compressor impeller

4. Turbine shaft
5. Tubular body
5a. End surface
6. Bearing housing
7. Turbine wheel-side ball bearing
8. Compressor impeller-side ball bearing
10. Outer race
10a. End surface
11. Inner race
11b. End surface
12. Ball
20. Outer race spacer
31, 32. Opposed wall
34. Inner race extension
$f_1$, $f_2$. Oil film

What is claimed is:

1. A bearing assembly for a turbocharger, comprising:
   a tubular body through which a turbine shaft extends, a turbine wheel and a compressor impeller being coupled together through the turbine shaft;
   a turbine wheel-side ball bearing comprising an outer race fitted to a first of two axial end portions of the tubular body, an inner race positioned inside of the outer race of the turbine wheel-side ball bearing and fitted to an outer periphery of the turbine shaft, and a plurality of balls between the outer race of the turbine wheel-side ball bearing and the inner race of the turbine wheel-side ball bearing;
   a compressor impeller-side ball bearing comprising an outer race fitted to a second of the two axial end portions of the tubular body, an inner race positioned inside of the outer race of the compressor impeller-side ball bearing and fitted to the outer periphery of the turbine shaft, and a plurality of balls between the outer race of the compressor impeller-side ball bearing and the inner race of the compressor impeller-side ball bearing;
   an outer race spacer between the outer race of the turbine wheel-side ball bearing and the outer race of the compressor impeller-side ball bearing, the outer race spacer being configured to keep the outer race of the turbine wheel-side ball bearing and the outer race of the compressor impeller-side ball bearing axially spaced apart from each other; and
   a bearing housing in which the tubular body is mounted such that an oil film capable of radially supporting the tubular body is present along an outer periphery of the tubular body,
   wherein the bearing housing includes a turbine wheel-side opposed wall opposed to an axially outer side of the outer race of the turbine wheel-side ball bearing, and a compressor impeller-side opposed wall opposed to an axially outer side of the compressor impeller-side ball bearing,
   wherein the tubular body has two axial end surfaces, and the outer race of the turbine wheel-side ball bearing and the outer race of the compressor impeller-side ball bearing each have an axial end surface located at a same axial position as, or at a position axially outwardly displaced from, a corresponding one of the two axial end surfaces of the tubular body, such that oil films capable of axially supporting the outer races are present between the respective outer races and the corresponding opposed walls, and
   wherein the bearing assembly does not include a spring.

2. The bearing assembly for a turbocharger of claim 1, wherein the outer race spacer is integral with the tubular body.

3. A method of manufacturing the bearing assembly for a turbocharger of claim 2, comprising:
   manufacturing outer race members each of which can constitute the outer race of the turbine wheel-side ball bearing, and outer race members each of which can constitute the outer race of the compressor impeller-side ball bearings;
   classifying the outer race members into a plurality of groups according to axial width dimensions of the outer race members;
   manufacturing tubular body members each of which can constitute the tubular body, and is integral with outer race spacer members each of which can constitute the outer race spacer;
   classifying the tubular body members into a plurality of groups according to axial width dimensions of the corresponding outer race spacer members; and
   matching the groups classified during the classifying of the outer race members with the groups classified during the classifying of the tubular body members, and assembling together outer race members of one of the groups classified during the classifying of the outer race members, and a tubular body member of one of the groups classified during the classifying of the tubular body members that is matched with the one of the groups classified during the classifying of the outer race members, into the bearing assembly.

4. The bearing assembly for a turbocharger of claim 2, wherein the inner race of the turbine wheel-side ball bearing and the inner race of the compressor impeller-side ball bearing each have an inner race extension extending axially inwardly such that axially inner end surfaces of the respective inner races contact each other.

5. The bearing assembly for a turbocharger of claim 1, wherein the inner race of the turbine wheel-side ball bearing and the inner race of the compressor impeller-side ball bearing each have an inner race extension extending axially inwardly such that axially inner end surfaces of the respective inner races contact each other.

6. The bearing assembly for a turbocharger of claim 1, wherein each of the outer race of the compressor impeller-side ball bearing and the outer race of the turbine wheel-side ball bearing includes a flange portion extending radially outwardly along a corresponding one of the two axial end surfaces of the tubular body.

7. The bearing assembly for a turbocharger of claim 1, wherein each of the compressor impeller-side ball bearing and the turbine wheel-side ball bearing includes a retainer.

8. The bearing assembly for a turbocharger of claim 7, wherein an inner diameter of the outer race spacer is smaller than respective inner diameters of the retainers of the compressor impeller-side ball bearing and the turbine wheel-side ball bearing.

9. The bearing assembly for a turbocharger of claim 7, further comprising oil holes, wherein the oil holes open at radial positions which are the same as, or radially inwardly of, respective radial positions of radially inner surfaces of the retainers of the compressor impeller-side ball bearing and the turbine wheel-side ball bearing.

* * * * *